Aug. 6, 1963    J. S. COURTNEY-PRATT    3,100,239
OPTICAL FOCUS AND RESOLUTION TESTING
METHODS AND APPARATUS

Filed Dec. 29, 1960                              2 Sheets-Sheet 2

INVENTOR
J. S. COURTNEY-PRATT
BY
H. O. Wright
ATTORNEY

United States Patent Office 3,100,239
Patented Aug. 6, 1963

3,100,239
OPTICAL FOCUS AND RESOLUTION TESTING
METHODS AND APPARATUS
Jeofry S. Courtney-Pratt, Springfield, N.J., assignor to Bell Telephone Laboratories, Incorporated, New York, N.Y., a corporation of New York
Filed Dec. 29, 1960, Ser. No. 79,285
4 Claims. (Cl. 88—56)

This invention relates to methods and apparatus for testing optical systems.

It has been the practice in the art when testing optical systems for focus and resolution to take a series of photographs with the successive photographic plates at a corresponding series of slightly different distances from the optical system. The spacing for optimum focus and resolution is then determined from inspection and comparison of the series of photographs. The parameters of the optical system can then be calculated by conventional methods. This is a laborious and time consumping operation and is therefore expensive.

A principal object of the invention is to reduce the effort, time and expense required in the testing of optical systems for focus and resolution.

A further object is to increase the facility and convenience of testing methods and apparatus for determining the focus and resolution of optical systems.

In accordance with the methods and apparatus of the invention, a transparent mask of graduated thickness is interposed, for example, between the photographic plate and the optical system. The mask is subdivided into a plurality of similar sectors or areas the thicknesses of which vary progressively by one or more significant "units of thickness" as will be described in detail hereinunder. The relative sharpness of focus and resolution of the several sectors or areas of the photographic image obtained on the plate can then be examined and the optimum distance for sharp focus and resolution of the specific optical system under test can be determined as will become apparent during the course of the detailed description given below. To facilitate the practice of the invention, an auxiliary low-power lens is preferably also employed in combination with the graduated mask to establish a substantially median reference plane within the range afforded by the mask. The distance of the image plane from the optical system can then be set for the nominal or intended focal length of the lens and if the actual focal length of the lens is the same as the nominal, the best focus and resolution should occur at the median sector of the image. The effect of changing the image plane in either direction from the median plane parallel to the axis of the optical system is then made apparent.

Obviously, the methods and arrangements of the invention are designed to eliminate the necessity of taking more than one photograph in testing an optical system for focus and resolution.

Further objects, features and advantages of the invention will become apparent during the course of the following detailed description of specific illustrative embodiments of apparatus units employed in exemplifying the application of the principles of the invention.

Figure 1:
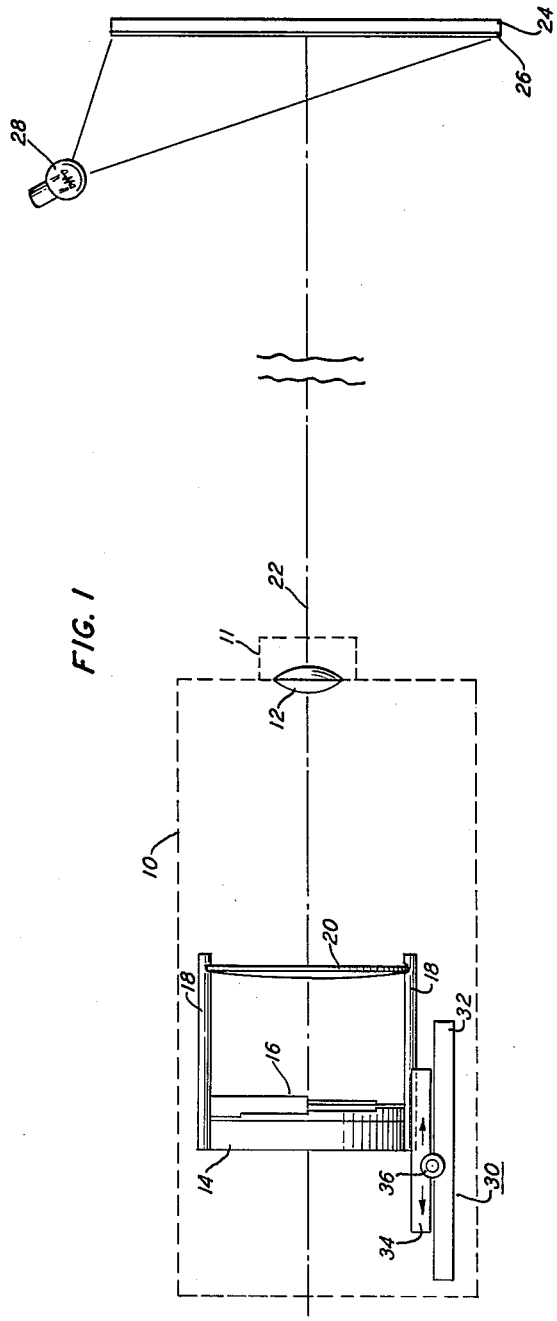
FIG. 1 illustrates one specific illustrative arrangement of the invention.

In more detail in FIG. 1, the area within broken line 10 is to be understood, for example, to include the interior of a substantially conventional camera assembly of any of numerous forms well known and extensively used in the art of photography.

Assembly 10 includes within it means at its right end for supporting an optical system to be tested. By way of example, a simple convex lens 12 is shown, but it is to be understood and will, it is believed, be obvious that any optical system, the focus and resolution of which are to be tested, can be tested substantially as described if appropriately dimensioned, associated apparatus units are selected. A conventional shutter mechanism indicated by broken line 11 excludes light from optical system 12 except when it is actuated to admit light for an appropriate limited time interval to produce a photographic image on plate 14.

Assembly 10 includes, near its left end, a stage 30, upon a horizontally sliding member 34 of which a vertically positioned photographic plate 14 is supported, as shown. The stage 30 includes a base member 32 upon which the upper or sliding member 34 can be moved to the right or to the left by distances which can be accurately controlled by turning knob 36. In accordance with conventional practice, a fixed calibrated scale over which an index marker, associated with and adapted to move with sliding member 34, travels should preferably be provided. From the scale the instant distance between lens 12 and the right surface of plate 14 could then be read. As such features are well known and extensively used in the art, illustration thereof in the drawing has been omitted.

The right surface of plate 14 is coated with a thin film of suitable photosensitive material for "taking a picture" of a test pattern situated at the plane on the opposite side of the lens which is substantially "conjugate" to the plane in which the photosensitive layer is located. (In accordance with conventional terminology in optics, the plane in which an object is located on one side of a lens or similar optical system and the plane on the other side of the lens, or optical system, in which the image is formed are designated "conjugate planes" of the lens or system.)

Placed immediately adjacent the right surface of plate 14 is a transparent mask 16 having several sectors or areas each of a predetermined different thickness. A number of suitable forms of mask and the functions of the mask will be described hereinunder.

An auxiliary lens 20 of low power is supported by positioning or standoff support 18 at a distance to the right approximately equal to the major dimension of plate 14. The function of lens 20 is to establish the "median" plane mentioned above and the characteristics and operation of lens 20 will be described in more detail hereinunder.

At a suitable distance to the right of lens 12 (that is, at substantially the "conjugate plane" to that in which the right surface of plate 14 is located) a flat plane screen 24 is supported with its major surfaces normal to central axis 22 of assembly 10. Upon the left major surface of screen 24 a plane test pattern 26 is mounted. A suitable source of illumination 28 is arranged to brightly illuminate the test pattern 26. Alternatively, it is obvious that screen 24 and test pattern 26 could be translucent and could then be illuminated by a suitable source to the right of screen 24.

The over-all arrangement obviously represents essentially a system for producing a photographic reproduction of test pattern 26 on the sensitized layer on the right surface of photographic plate 14 having a plurality of sectors or areas which represent, in effect, the focus and resolution of the lens or optical system for a like plurality of image to lens distances. Obviously, sectors or areas of test pattern 26 corresponding to those of the graduated mask, respectively, should be identical or sufficiently alike that comparison of focus and resolution of the several areas of the photograph can be readily made.

Figure 2:
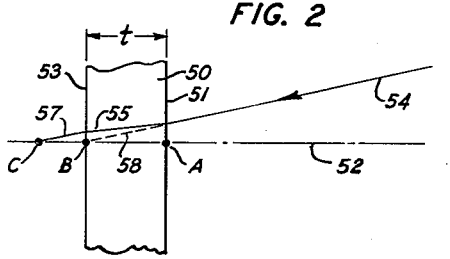
FIG. 2 is a diagram illustrating one principle involved in the practice of the invention.

Referring now to the diagram of FIG. 2, the principle involved in the use of the transparent mask will be described. If incident light ray 54 is continued in a straight line path toward the left, as indicated by broken line 58, it will intersect the horizontal axis 52 of the diagram at point B. (It will be assumed that ray 54 is being focussed on point B by a lens or an optical system the central axis of which coincides with axis 52.)

If a plate 50 of transparent material having parallel plane major surfaces 51 and 53 and a thickness $t$ between them is interposed in the path of ray 54, the surfaces 51 and 53 being normal to axis 52 and the refractive index of the transparent material being greater than that of the surrounding medium (normally the air), ray 54, upon entering plate 50, will be refracted upwardly from its straight line path 58, as indicated for example by line 55. Upon leaving surface 53 ray 54, 55 will be refracted by a like amount in the opposite direction (downwardly) as indicated for example by line 57, and will consequently be parallel to the original line 54. Line 57 is, however, displaced upwardly sufficiently that it will not intersect axis 52 until it reaches point C.

Obviously, inserting plate 50 has the effect of shifting the effective focus from point B to point C.

If the surrounding medium is air, as it will be in the great majority of instances, and the refractive index of plate 50 is assumed, by way of example, to be 1.5, it can be shown that the distance between points B and C is equal to one third the thickness $t$ of plate 50. Thus to shift the effective focal point by one mil (.001 inch) plate 50 should be three mils (.003 inch) thick. This thickness, or any suitable multiple of it, can obviously be conveniently employed as a "unit of thickness" in making the graduated, transparent masks, such as 16 of FIG. 1, of materials having the refractive index 1.5. It should be noted that such plates (having a refractive index greater than that of the surrounding medium) move the effective focus in one direction only, namely further away from the lens or optical system, the distance being determined, of course, by the thickness of the plate.

It is obvious that the use of the "graduated" transparent mask 16 having a plurality of sectors or areas of different discrete thicknesses, respectively, will result in an image, corresponding areas or sectors of which, insofar as focus and resolution are concerned, are representative of partial images which would be obtained were the plate successively displaced along axis 22 by appropriate different amounts for each section, respectively. Each portion of the image will, of course, be in effect "displaced" by a distance proportional to the thickness of that portion of the mask through which the light reaching it had to travel. It is further obvious that the graduated transparent mask could be placed on the left surface of test pattern 26 if proportioned suitably to compensate for the magnification of the optical system.

Figure 5A:
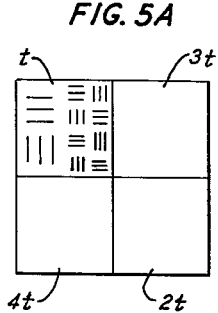
FIGS. 5A, 5B and 5C illustrate three varieties of graduated, transparent masks for use in arrangements of the invention.
Figure 5B:
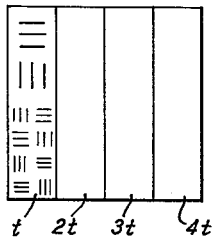
Figure 5C:
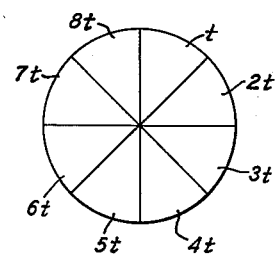

Three of the (obviously very numerous) possible ways of arranging the portions of different thickness of the mask are illustrated, by way of examples, in FIGS. 5A, 5B and 5C, respectively.

In FIG. 5A the upper left quarter has a thickness "$t$" producing, for example, a shift of the effective focal point by one mil (.001 inch), the lower right corner has a thickness "$2t$" producing a shift of two mils, et cetera, as indicated. Each step "$t$" may obviously be two or more mils depending upon the particular optical system being tested and the accuracy desired. Each sector contains like patterns of closely spaced lines, horizontal and vertical groups of various spacings being included to assist an observer in judging which sector shows optimum focus and resolution.

In FIG. 5B, the mask is divided into four vertical strips (having patterns similar to those in the sectors of the mask of FIG. 5A) producing progressively from left to right one more mil (.001 inch) shift, or multiples thereof, from strip to strip.

In FIG. 5C the mask is circular and is divided into eight sectors having thicknesses varying in unit steps from $t$ through $8t$, inclusive, as shown. Each sector includes a pattern of radial lines tapering from the circumference toward the center to produce a so-called "rising sun" pattern to assist an observer in judging which sector shows optimum focus and resolution.

Obviously, a graduated multi-step transparent mask, such as those illustrated in FIGS. 5A, 5B and 5C and described in detail above, could be employed in an arrangement such as that of FIG. 1 without auxiliary lens 20, for by setting the distance of the plate 14 from lens 12 by control knob 36 of FIG. 1 to be a few mils greater than the distance at which a specific lens 12 being tested should produce an image of pattern 26, a single photograph could be obtained having one sector which should be accurately in focus were the actual distance of the lens from plate 14 within a few mils of the nominal or expected distance for the specific lens or optical system.

The somewhat awkward necessity of basing the initial setting on an estimate within the range of the transparent mask results of course from the fact, mentioned above, that the insertion of plane transparent members as described immediately above can, under ordinary conditions, cause a movement of the effective image plane in one direction only, that is, it can only move the effective image plane away from the lens. (This assumes, of course, that the plane transparent members have a refractive index greater than that of the surrounding medium as will normally be the case.)

However, it would obviously be more convenient if the apparatus could be initially adjusted directly to the nominal image to lens distance of the specific lens or optical system to be tested as a median adjustment and indications corresponding in effect to both greater and smaller distances could be more directly obtained about the median, since the likelihood of miscalculation or mistake, in making the initial setting otherwise required, would be substantially reduced. The provision of an auxiliary lens 20 makes it possible to do this, as will now be explained.

Figure 3:
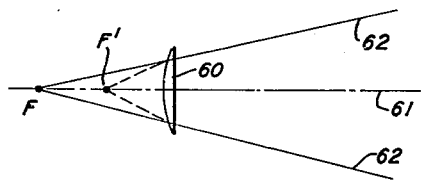
FIG. 3 is a diagram illustrating a second principle involved in the practice of the invention.

In FIG. 3, rays 62 are assumed to be rays focussed by a lens (not shown) at the right which in the absence of any disturbing influence would converge to a focus at point F. Obviously by inserting a low-power auxiliary lens 60 in the paths of rays 62 they can be caused to come more directly to a focus as illustrated, for example, at point F'.

Accordingly, if, for example, in the arrangement of FIG. 1 the graduated mask 16 is of the eight sector type illustrated in FIG. 5C in which each sector produces an increase of, for example, one mil in the effective focal distance and auxiliary lens 20 is proportioned to decrease the effective focal distance of the lens by four mils, the "$4t$" sector should be accurately in focus if the plate 14 is set by knob 36 at the distance corresponding to the nominal focal length of the lens under test and the actual focal length of the lens is the same as its nominal focal length.

For such a situation, if sector "$5t$" is found to be the one in which optimum focus and resolution is indicated then the actual focal distance of the lens is one mil less than its nominal value, or correspondingly if sector "$3t$" is found to be optimum then the actual focal distance of the lens is one mil greater than its nominal value, et cetera.

Thus it is apparent that the introduction of the auxiliary lens 20 contributes substantially toward the flexibility and convenience of the system as well as toward making the operation of the over-all system more simple and "goofproof."

Figure 4A:
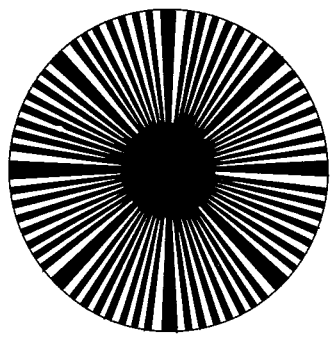
FIG. 4A illustrates one form of test pattern suitable for use in particular arrangements of the invention.

In FIG. 4A a suitable test pattern is illustrated for use with the eight sector mask of FIG. 5C and is, as mentioned above, essentially the "rising sun" type of pattern. This pattern or any other easily recognized pattern substantially symmetrical with respect to the several sectors of the particular transparent mask being used can obviously be employed to advantage in the arrangement of FIG. 1.

Figure 4B:
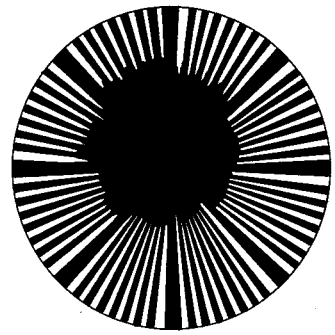
FIG. 4B illustrates a typical image obtained when employing a graduated transparent mask in accordance with the invention.

In FIG. 4B a representative image or photograph of the test pattern of FIG. 4A is illustrated when taken with the eight sector mask of FIG. 5C used in the arrangement of FIG. 1. It is apparent from FIG. 4B that, for the specific image shown, sector $4t$ produces optimum focus and resolution and, accordingly, assuming auxiliary lens 20 of FIG. 1 fixes sector $4t$ as the median sector, the lens with which the image of FIG. 4B was obtained has been accurately fabricated to its nominal focal length.

Numerous and varied modifications and rearrangements of the illustrative structures described hereinabove can be readily devised by those skilled in the art without departing from the spirit and scope of the present invention. Obviously, the principles of the invention are readily applicable to testing the focus and resolution of almost any optical system.

What is claimed is:

1. The method of testing the focus and resolution of an optical system which comprises, supporting the optical system on a common central axis with a plane test pattern and a plane photographic plate, the test pattern and plate being situated substantially in conjugate planes on opposite sides of the optical system, interposing between the plate and the optical system and closely adjacent to the plate a mask of a material freely transmitting substantially the full frequency spectrum of visible light and having a greater refractive index than that of the surrounding medium, the mask comprising a plurality of sectors of progressively increasing thickness, illuminating the test pattern and exposing the plate to the image of the test pattern formed by the optical system whereby comparison of the sectors of the image corresponding to the sectors of the mask provides an indication of the actual distance from optical system to plate at which the focus and resolution of the optical system are optimum.

2. The method of claim 1 with the additional step of interposing between the optical system and the photographic plate a low-power lens which reduces the effective focal length of the optical system by an amount substantially equal to the increase in effective focal length produced by the sector of the transparent masking screen of median thickness.

3. Apparatus for testing the focus and resolution of an optical system comprising means for supporting the optical system to be tested, means for supporting a plane test pattern at an appropriate distance on one side of the optical system and normal to the central axis of the system, means for illuminating the test pattern, means for supporting a photographic plate on the other side of the optical system substantially at the conjugate plane with respect to the optical system to focus an image of the test pattern on the plate, means for normally excluding light from the plate, a mask of a material freely transmitting substantially the full frequency spectrum of visible light and having a refractive index greater than that of the surrounding medium, the mask having a plurality of sections differing progressively in thickness by discrete steps, the mask being placed between the optical system and the plate and closely adjacent to the plate, and shutter means adapted to appropriately expose the plate to the image of the test pattern produced by the optical system, whereby an image is obtained on the photographic plate having a plurality of sections representing the focus and resolution of the optical system for a like plurality of slightly differing effective distances between the optical system and the photographic plate, respectively, from which the optimum distance for the clearest actual focus and resolution of the optical system can be deduced.

4. The apparatus of claim 3 and an auxiliary low-power converging lens interposed between the optical system being tested and the transparent mask, the lens being proportioned to neutralize the effective displacement of a sector of the mask having a substantially median thickness whereby greater flexibility and simplicity in use of the system are realized.

References Cited in the file of this patent

UNITED STATES PATENTS 2,777,355    Lindsey _____ Jan. 15, 1957

FOREIGN PATENTS 741,508    Germany _____ Nov. 12, 1943

OTHER REFERENCES

Precision Camera for Testing Lenses, Research Paper RP 984, Journal of Research of the National Bureau of Standards, vol. 18, April 1937, Gardner et al.